(12) United States Patent
Creomar Lima, Jr. et al.

(10) Patent No.: US 11,603,861 B2
(45) Date of Patent: Mar. 14, 2023

(54) SYSTEM FOR THE CIRCULATION OF GAS IN AIRS GAPS OF ROTATING MACHINES

(71) Applicant: FMC TECHNOLOGIES DO BRASIL LTDA, Rio de Janeiro (BR)

(72) Inventors: Lafaete Creomar Lima, Jr., Rio de Janeiro (BR); Anderson Moita Witka, Rio de Janeiro (BR); Eduardo Wong Cardoso, Rio de Janeiro (BR); Heloisa Helena da Silva Folhadella, Niterói (BR)

(*) Notice: Subject to any disclaimer, the term of this patent is extended or adjusted under 35 U.S.C. 154(b) by 390 days.

(21) Appl. No.: 16/613,080

(22) PCT Filed: May 9, 2018

(86) PCT No.: PCT/BR2018/050152
§ 371 (c)(1),
(2) Date: May 15, 2020

(87) PCT Pub. No.: WO2018/205002
PCT Pub. Date: Nov. 15, 2018

(65) Prior Publication Data
US 2020/0340495 A1    Oct. 29, 2020

(30) Foreign Application Priority Data

May 10, 2017    (BR) .......................... 102017009824-9

(51) Int. Cl.
*F04D 29/58*    (2006.01)
*F04F 5/04*    (2006.01)
(Continued)

(52) U.S. Cl.
CPC ....... *F04D 29/5806* (2013.01); *F04D 13/086* (2013.01); *F04F 5/04* (2013.01);
(Continued)

(58) Field of Classification Search
CPC ...... F04D 29/5806; F04D 7/04; F04D 13/086; F04F 5/04; F04F 5/54; F04F 5/16; F04F 5/20; F01P 5/02; H02K 5/132
(Continued)

(56) References Cited

U.S. PATENT DOCUMENTS 3,514,167 A    5/1970  Wahl et al.
3,698,839 A *  10/1972 Distefano ............... F04C 28/24
                                                   417/299

(Continued)

FOREIGN PATENT DOCUMENTS

BR    PI0616912 A2    1/2013
BR    102013009262 A2    5/2015
(Continued)

OTHER PUBLICATIONS

International Search Report issued in International Application No. PCT/BR2018/050152, dated Jul. 27, 2018 (3 pages).
Written Opinion issued International Application No. PCT/BR2018/050152, dated Jul. 27, 2018 (5 pages).

*Primary Examiner* — Charles G Freay
(74) *Attorney, Agent, or Firm* — Osha Bergman Watanabe & Burton LLP

(57) ABSTRACT

A system for the recirculation of gas in air gaps of rotating machines via an ejector, a motor and a pump, including circulating a gas extracted from a gas-extraction unit which is located in the pump. This gas circulates in the gap between the rotors and the stator of the motor. The rotor of the motor is coupled to the shaft of the pump, and in one or more embodiments the gas from the gas-extraction unit flows from the pump to the ejector in order to be injected into the air gap between the rotor and the stator, thereafter returning to a process line. In one or more embodiments, the gas from the gas-extraction unit flows from the pump, and is injected (Continued)

directly into the air gap, and thereafter passes via the ejector in order to recirculate the gas to the process line.

2 Claims, 3 Drawing Sheets

(51) Int. Cl.
| | |
|---|---|
| *F04F 5/54* | (2006.01) |
| *F04D 13/08* | (2006.01) |
| *F04D 7/04* | (2006.01) |
| *H02K 5/132* | (2006.01) |
| *F04F 5/16* | (2006.01) |
| *F01P 5/02* | (2006.01) |
| *F04F 5/20* | (2006.01) |

(52) U.S. Cl.
CPC .............. *F04F 5/54* (2013.01); *F01P 5/02* (2013.01); *F04D 7/04* (2013.01); *F04F 5/16* (2013.01); *F04F 5/20* (2013.01); *H02K 5/132* (2013.01)

(58) Field of Classification Search
USPC .............................. 417/88, 89, 366, 368–370
See application file for complete search history.

(56) References Cited

U.S. PATENT DOCUMENTS

| | | |
|---|---|---|
| 5,412,977 A | 5/1995 | Schmohl et al. |
| 9,032,987 B2 * | 5/2015 | Bjorge ............... F04D 1/00 137/171 |

FOREIGN PATENT DOCUMENTS

| | | |
|---|---|---|
| GB | 888211 A | 1/1962 |
| GB | 2443117 A | 4/2008 |
| WO | 2005003512 A1 | 1/2005 |
| WO | 2010083427 A1 | 7/2010 |

\* cited by examiner

SYSTEM FOR THE CIRCULATION OF GAS IN AIRS GAPS OF ROTATING MACHINES

TECHNICAL FIELD

The present application describes a system for injecting gases into air gaps of rotating machines, through an ejector, pump and a motor. Such system may be used in subsea equipment, subsea pumping, subsea engines, subsea compressors, rotating machines.

BACKGROUND

The production of reservoir fluids typically contains a mixture of hydrocarbons, gas and oil, along with water and sand. In the initial period of well production, the largest fraction of oil production is obtained, which is the most profitable component, while the water fraction is lowest. However, the well production curve, over the time describes significant inversion with which fluid fractions are produced. Throughout the well lifetime there is a need for using artificial lifting methods so that the recovered oil fraction remains profitable.

Usually artificial lifting methods are used in oil reservoirs with complex proprieties, which make it difficult to guarantee flow from the well to the production unit. The use of gas lift, water injection, gas or steam injection or subsea pumping are some typically applied techniques.

Subsea pumping encompasses different technologies of motors and pumps, in order to match equipment functions to system requirements, and its characteristics, such as required head pressure ("head"), fluid composition, fraction of gas ("gas volume fraction"—GVF), viscosity, WC variations ("watercut"), presence of emulsions and representative amounts of sand. Helical-axial and centrifugal hydraulics have been adopted by the market for subsea pumping.

Subsea pumps have been used in deep water depths, e.g., above 1000 m, and may be located inside the oil well or in subsea bed. From the aforementioned applications, the adoption of centrifugal pump may require a well drilled exclusively for its installation, which receives the production of reservoir fluids, coming from production well, and may also require the gas be separated to achieve remain gas contents acceptable to enter the pump without causing any damage.

It is known from the industry that centrifugal pumps can tolerate around 20% of gas volume fraction in production stream to be pumped. Intervention on equipment when it is installed inside a well is very costly when compared to intervention on equipment when it is installed in a seabed, even causing production interruption. The helical-axial hydraulic pumps, on the other hand, have greater tolerance to the gas fractions to be pumped along with liquid fractions and, moreover, are installed in a subsea bed.

Briefly, a pumping or compression system consists of a motor and a pump or compressor itself. The motor rotor is coupled to the pump shaft and may be the same shaft in some applications. The pump or compressor is also composed of a rotating part, coupled to the shaft, called impellers, which are components responsible for transferring energy to the fluid, in addition, the pump has static components, called diffusers, whose function is to condition the flow. Other accessories and devices may be assembled in a set according to specific application needs.

Electric motors used to drive devices where pressurized process fluid is present, for example pumps and compressors, must be designed to prevent process fluid from entering the motor. One solution is to separate the motor and pump into individual housings so that any leak is collected outside the system. In a subsea system, housings generally communicate with each other, having a mechanical seal as a barrier between them. However, because it is a dynamic seal, a small leakage of fluid occurs from the high-pressure side to the low-pressure side. This seal is then pressurized by the motor side with a barrier fluid, causing a leak in the pump direction.

In most motors, barrier fluid should have controlled electrical characteristics, generally being a dielectric mineral oil, contaminant-free and with controlled water concentration. Some systems may use fluids with softer specifications, for example, in coiled wire motors, where electrical fluid characteristics are not crucial.

Barrier fluid can be either a fluid with well-defined electrical characteristics such as a dielectric mineral oil, or a fluid with softer specifications, such as where motor windings are wired. In addition to the main barrier function, this fluid also has the secondary function for cooling the motor. The barrier fluid system requires that it be installed on topside utilities, a skid with hydraulic panels and an umbilical-connected mineral fluid reservoir for continuous supply of barrier fluid to subsea equipment. The need for a barrier fluid system results in operational supervision and cost to operation since barrier fluid is consumable and requires periodic replacement.

The use of barrier fluid has the disadvantage: the requirement for a dedicated system for surface unit fluid supply, typically located on the platform Turret, occupies umbilical lines with fluid transfer to the motor, requires operators' supervision and maintenance, consumes platform energy.

In addition, the use of barrier fluid, which is most often a liquid, also presents significant losses due to the drag generated by the relative movement between the static and the rotating part. Therefore, the presence of a viscous fluid in the motor gap may mean a low efficiency for a large diameter or high-speed motor and may make the machine operation impracticable.

One solution to this problem is the use of a compressed gas in this gap, but the circuit of this gas must be such that the pressure difference causes a constant gas leakage through the seal towards the process fluid, which requires a gap pressure greater than that of the fluid interface. In the case of a pump, for example, if the discharge is closest part to the annulus, the pressure must be greater than the discharge pressure, which may require a dedicated compression system for annular gas.

A second solution is to drain the gap constantly, removing mainly gas. However, in this situation, the process fluid pressure is greater than the gap pressure, causing the process fluid leak to gap, therefore this drain is also responsible for removing this liquid and directing it to another point of the system.

SUMMARY

The present application relates to a system for injecting gas into the air gaps of rotating machines ("air gap") (20), such system comprises the use of a pump (32), a motor (18) and an ejector (10). The present has two or more embodiments.

One or more embodiments features a system (30) which allows a reduction in fluid viscosity in the air gap ("air gap") (20) between rotor (28) and stator (26) of motor (18), wherein this low viscosity fluid (12) coming from discharge (58) of ejector (10), where this low viscosity fluid (12) is the result of mixing a gas (08) from the gas-extraction unit (24) of pump (32) with a motivation fluid (48) coming from discharge (14) of pump (32).

One or more embodiments features a system (40) allowing for reduction of viscosity of fluid in air gap ("air gap") (20) between rotor (28) and stator (26) of motor (18), wherein a gas (08) from a gas-extraction unit (24) circulates through air gap ("air gap") (20) and thereafter through an ejector (10) the fluid (12) flows to the process line upstream of pump (32).

BRIEF DESCRIPTION OF THE DRAWINGS

The present application may be well understood from the accompanying illustrative figures, which in a schematic and non-limiting scope manner represent.

DETAILED DESCRIPTION

The present application describes systems for injecting gas into the air gaps of rotating machines ("air gap") (20), such systems comprise the use of a pump (32), a motor (18) and an ejector (10). The present application, by way of illustration, will describe two or more embodiments.

Figure 1:
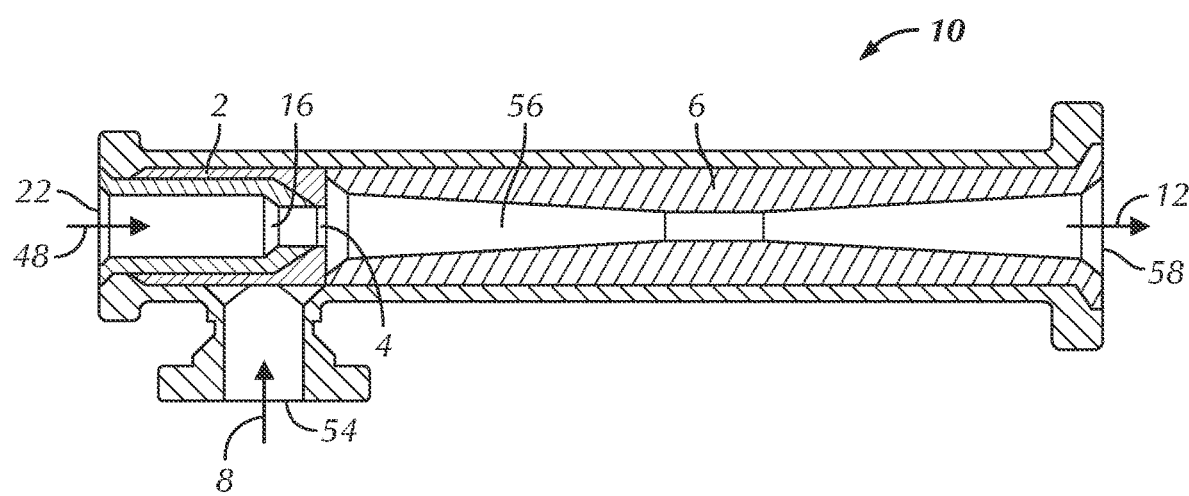
FIG. 1—Ejector and its components.

The present application uses an ejector (10) which is an equipment for suctioning or pressurizing fluids, as can be seen in FIG. 1, the ejector (10) comprising a converging nozzle (02) ("nozzle") having a motivating inlet (22) and a narrowing (16) in its outlet, further provided with a perpendicular suction inlet (54), said converging nozzle (02) and suction inlet (54) both being interconnected to a throat (04) where the mixture of suction gas (08) and motivation fluid (48) occur, and said throat (04) being continued by or coupled to a diffuser (06), which is responsible for the pressurization of mixture of gas (08) and motivation fluid (48) and therefore conditioning the discharge fluid (12) to the required pressure. The pressurized fluid (48), at certain $P_m$ e $Q_m$ (motivation pressure and flow), is received in motivating inlet (22) of ejector (10), and when it passes through converging nozzle (02), its potential energy is converted in kinetic energy, due to narrowing (16) of area imposed by the nozzle (02), so that immediately after the nozzle (02) a low pressure zone (56) is generated. The low pressure generated causes a pressure differential between the suction inlet (54) and the throat (04), receiving fluid at certain $P_s$ e $Q_s$ (suction pressure and flow) by means suction inlet (54).

Motivation and suction flows are summed in throat (04) of ejector (10), conditioning the increase of mixture fluid speed. Downstream of throat (04), a diffuser (06) is responsible for converting speed again into pressure, and thus the pressure in discharge (58) of ejector (10) may be sized intermediate the motivation pressure and suction pressure.

The system described below encompasses two or more embodiments using an ejector (10), in order to provide separate gas recirculating through air gap (20) ("air gap").

Figure 2:
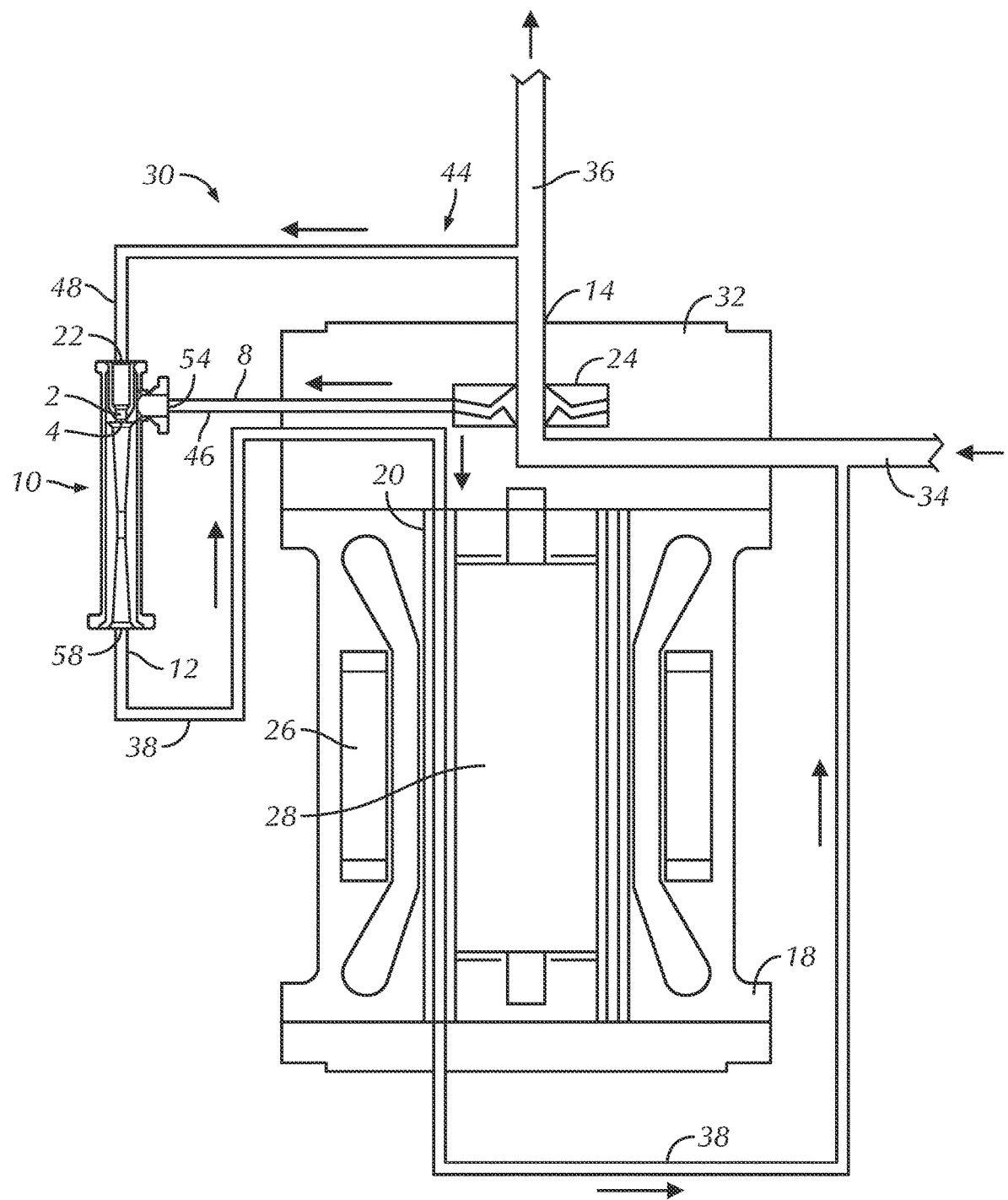
FIG. 2—Schematic of the high GVF fluid circulation of the discharge of the ejector through air gap ("air gap")

One or more embodiments of the system for injecting gas into the air gaps of rotating machines (30), represented by the schematic in FIG. 2, comprises an ejector (10) which uses as motivation fluid (48) the discharge fluid line (36) of pump (32), said ejector (10) being connected to discharge line (36) through pipe (44). In one or more embodiments, system (30) also comprises a pump (32) having in its constitution a gas-extraction unit (24) responsible for extracting from the fluid of the process line (34), the gas (08) to be used by the ejector (10). One or more embodiments of the system (30) also has a motor (18) comprising a stator (26) and a rotor (28), wherein this rotor (28) is coupled to shaft of pump (32), and wherein rotor (28) surrounded by stator (26) forms an air gap (20) ("air gap").

Gas (08) which come from gas-extraction unit (24) of pump (32), is sucked by ejector (10), via suction inlet (54), the ejector (10) and gas-extraction unit (24) are connected through pipe (46). The mixture of gas (08) and motivation fluid (48) occurs in throat (04) of ejector (10) and then is pressurized by diffuser (06) and injected in air gap (20) between rotor (28) and stator (26) by means of a pipe (38).

The fluid from discharge (12) of ejector (10) contains very high GVF ("gas volume fraction") content, such characteristic conditions the gas, along with some remaining fluid, to be mostly circulated by air gap ("air gap") (20) through a pipe (38), and therefore, a very low viscosity fluid in air gap ("air gap") (20) is obtained, which implies in minimal drag losses, to which the rotating and static surfaces may be subjected to.

Following the discharge fluid circulates through air gap (20), it is injected in process line (34) through a pipe (42) upstream of pump (32). Such configuration may be used in systems requiring a fluid be circulated with high pressure by air gap ("air gap") (20), and accordingly certain liquid amount may be received and drained from air gap ("air gap") (20).

Figure 3:
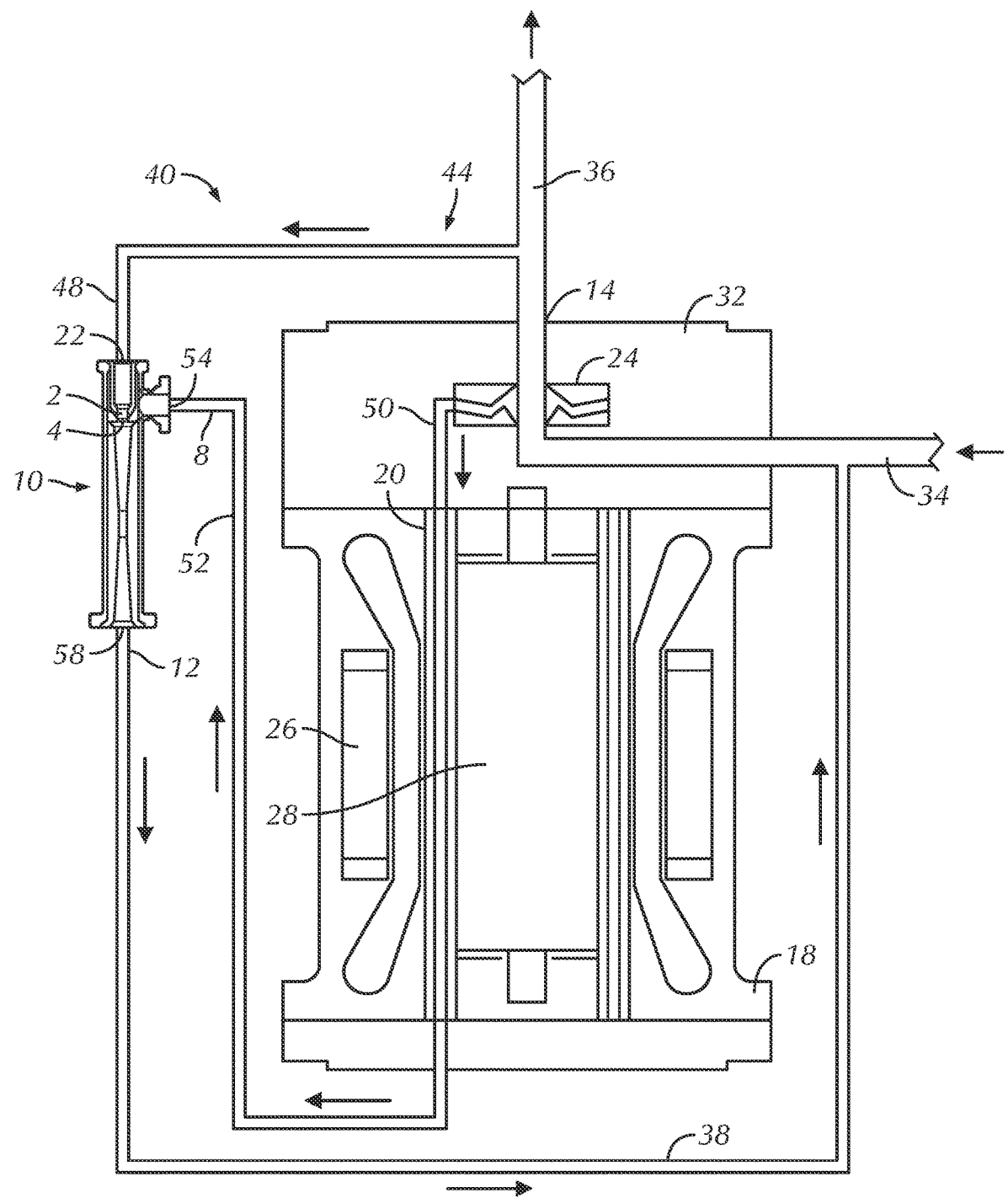
FIG. 3—Schematic of the air gap ("air gap") circulation of gas suctioned by the ejector.

One or more embodiments of the system for injecting gas into the air gaps of rotating machines (40), represented by the schematic in FIG. 3, comprises an ejector (10) which uses, as motivation fluid (48), the discharge fluid line (36) from pump (32), said ejector (10) being connected to the discharge line (36) through pipe (44). One or more embodiments of system (40) also comprises a pump (32) having in its constitution a gas-extraction unit (24) responsible for extracting fluid from process line (34), the gas (08). One or more embodiments of system (40) also has a motor (18) comprising a stator (26) and a rotor (28), wherein such rotor (28) is connected to the shaft of pump (32), and wherein rotor (28) surrounded by stator (26) forms an air gap (20) ("air gap").

Said gas (08), from gas-extraction unit (24), is sucked by ejector (10), via suction inlet (54), in order to circulate in air gap (20) before being pressurized by ejector (10). The gas-extraction unit (24) is connected to the air gap (20) of motor (18) through pipe (50), and air gap (20) of motor (18) is connected to suction inlet (54) of ejector (10) through pipe (52). Ejector (10) is responsible for mixing the gas (08) coming from air gap (20) with motivation fluid (48), said mixing occurs in throat (04) of ejector (10) and afterwards it is pressurized by diffuser (06) and injected in process line (34) through pipe (38) connecting the discharge (58) of ejector (10) to said process line (34) upstream of pump (32).

In one or more embodiments of system (40), the gas (08) does not circulate with very high GVF, however when air gap (20) sucks gas (08) from gas-extraction unit (24), a very low viscosity fluid circulates in air gap. Therefore, this configuration may be used in systems where the operating pressure in air gap ("air gap") (20) is approximately equal to suction pressure of pump (32).

Effects and benefits related to embodiments may include:
Increase in efficiency of motor (18);
Reduction of losses due to drag;
The fact of dispensing a barrier fluid system, typically used to ensure the integrity and functioning of motor-hydraulic system;
To decrease the operating cost of the subsea pumping/compressor system;
To simplify the interface between motor (18) and surface unit by reducing barrier fluid lines;
To decrease the space required on the platform to adopt subsea pumping systems;
To use compact equipment without moving parts capable of mobilizing low viscosity fluid at low pressure and conditioning it for recirculation;
To use a separate process fluid pressurized by a subsea equipment or device to promote recirculation of this gas through the air gap (20) between the stator (26) and rotor (28); and
To use a separator gas for circulating in air gap ("air gap") (20) from a separator upstream of rotating equipment or integrated with rotating equipment.

The invention claimed is:

1. A system for the circulation of gas in annular spaces of rotating machines, comprising:
    a pump provided with a gas-extraction unit and coupled to a rotor of a motor through a shaft, said rotor surrounded by a stator forming an annular space between said rotor and said stator, wherein the gas-extraction unit separates gas from a fluid in a process line;
    an ejector comprising:
        a converging nozzle, the converging nozzle provided with a motivating inlet and a narrowing at an outlet of the converging nozzle, said converging nozzle being connected to a discharge line of the pump through a first pipe,
        said ejector being further provided with a suction inlet perpendicular to a longitudinal flow axis through the ejector, said suction inlet being connected to the gas-extraction unit through a second pipe,
        said converging nozzle and suction inlet both being interconnected to a throat of the ejector where a mixture of motivation fluid from the motivating inlet and the gas coming from the gas-extraction unit is formed, said throat being fluidly coupled to a diffuser where the mixture of motivation fluid and gas is pressurized,
    wherein the annular space is connected to a discharge of the ejector through a third pipe; and the annular space is connected to the process line upstream of the pump through a fourth pipe.

2. A system for the circulation of gas in annular spaces of rotating machines, comprising:
    a pump provided with a gas-extraction unit and coupled to a rotor of a motor through a shaft, said rotor surrounded by a stator forming an annular space between the rotor and the stator;
    an ejector comprising a converging nozzle, the converging nozzle provided with a motivating inlet and a narrowing in an outlet of the converging nozzle, said converging nozzle being connected to a discharge line of the pump through a first pipe, said ejector being further provided with a suction inlet perpendicular to a longitudinal flow axis through the ejector, said suction inlet being connected to the annular space through a second pipe, said converging nozzle and suction inlet both being interconnected to a throat of the ejector where a mixture of motivation fluid from the motivating inlet and gas coming from the annular space is formed, said throat being fluidly coupled to a diffuser where the mixture of motivation fluid and gas is pressurized,
    wherein the gas-extraction unit of the pump is connected to the annular space through a third pipe;
    wherein a discharge of the ejector is connected to a process line upstream of the pump through a fourth pipe, and
    wherein the ejector sucks gas from the annular space through the suction inlet.

* * * * *